United States Patent

[11] 3,608,992

| [72] | Inventors | Robert A. Phelps<br>Kettering;<br>Thomas J. Negrelli, Dayton, both of Ohio |
|---|---|---|
| [21] | Appl. No. | 47,372 |
| [22] | Filed | June 18, 1970 |
| [45] | Patented | Sept. 28, 1971 |
| [73] | Assignee | The National Cash Register Company<br>Dayton, Ohio |

[54] MULTIPLEX HOLOGRAPHY WITH FRESNEL DIFFRACTION PATTERN CODED REFERENCE BEAMS
8 Claims, 10 Drawing Figs.

[52] U.S. Cl. .................................................. 350/3.5, 350/162 R
[51] Int. Cl. ..................................................... G02b 27/00
[50] Field of Search ........................................... 350/3.5, 162 SF, 162 R; 356/71; 340/5 H; 181/0.5 R

[56] References Cited
UNITED STATES PATENTS
| 3,501,221 | 3/1970 | Lohmann ..................... | 350/3.5 |
| 3,544,197 | 12/1970 | Weaver ........................ | 350/3.5 |

OTHER REFERENCES

Stroke et al, Applied Physics Letters, Vol. 7, No. 6, Sept. 1965, pp. 178–179 (copy in 350/3.5)

Stroke et al, Japanese Journal of Applied Physics, Vol. 7, No. 7, July 1968, pp. 764–766 (copy in 350/3.5)

*Primary Examiner*—David Schonberg
*Assistant Examiner*—Ronald J. Stern
*Attorneys*—Louis A. Kline, John J. Callahan and John P. Tarlano ABSTRACT: The present invention relates to a method of forming and utilizing a hologram by placing a Fresnel diffraction pattern and a Fourier transform lens in the reference beam during the formation of the hologram. An object pattern is placed in the object beam. A hologram of the near field or the far field of the object beam is formed by interfering the object beam and the reference beam at a recording medium in the focal plane of the Fourier transform lens. A reconstruction of the object pattern is produced from the hologram by passing the reference beam through the Fresnel diffraction pattern, the Fourier transform lens, the hologram, and a reconstruction lens.

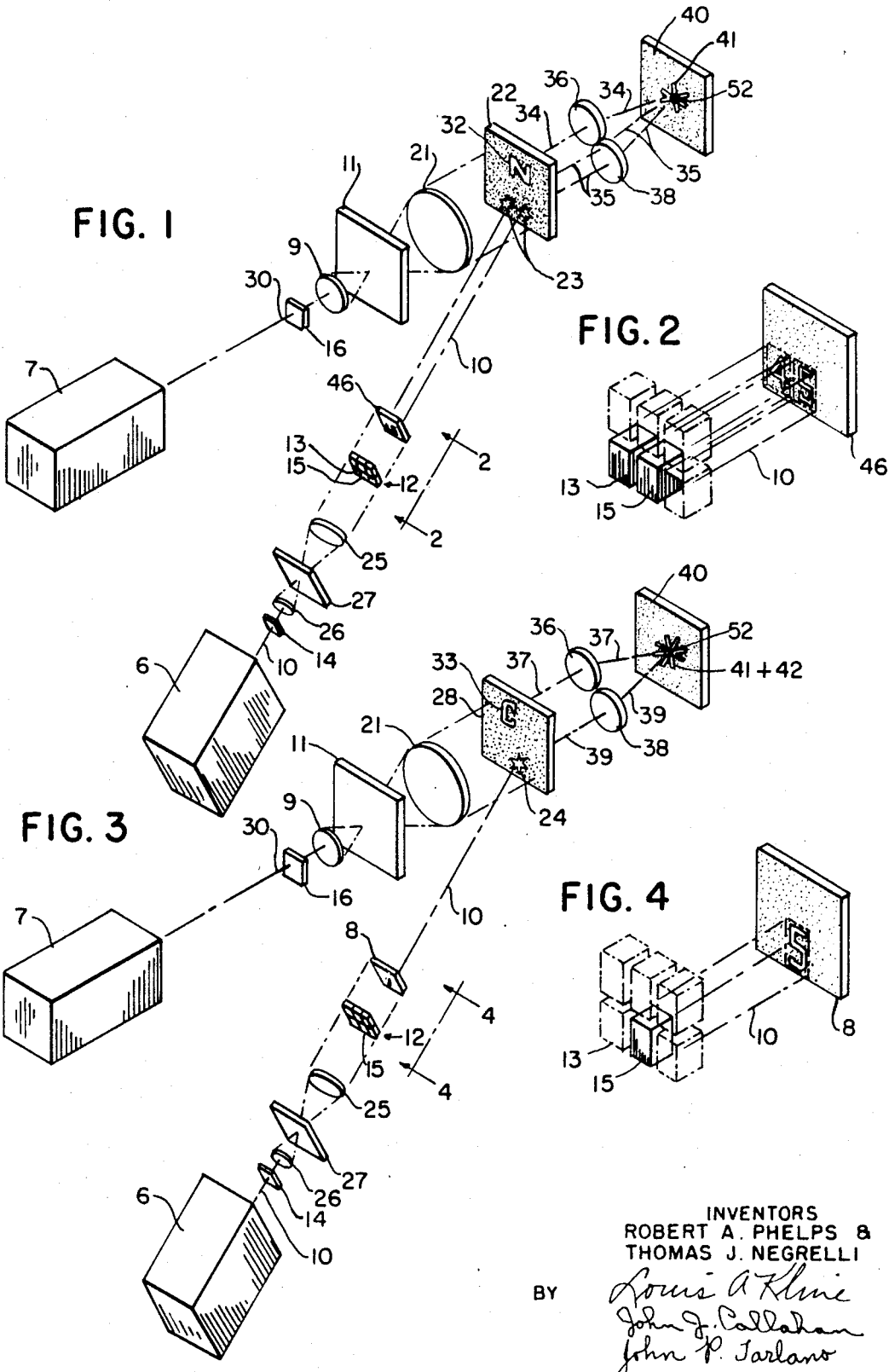

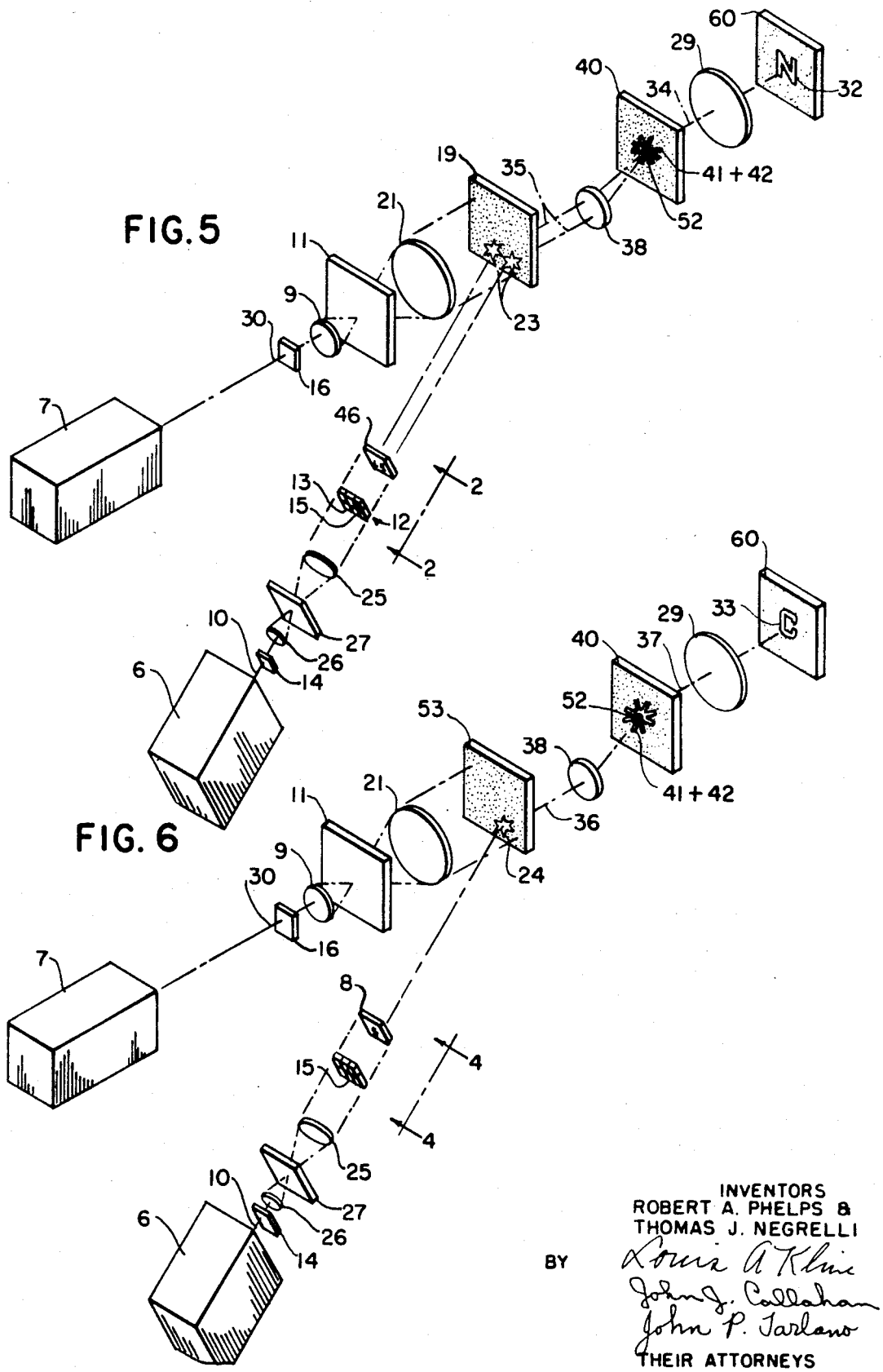

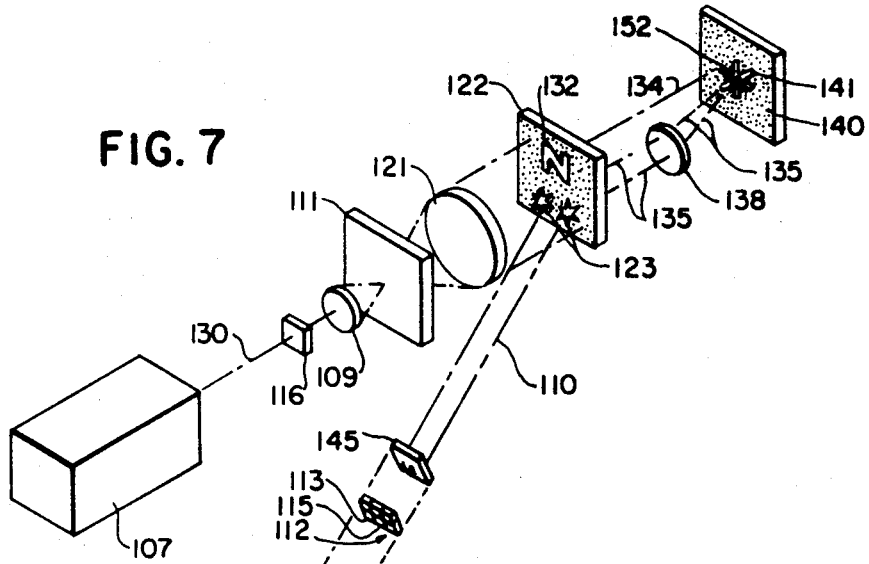
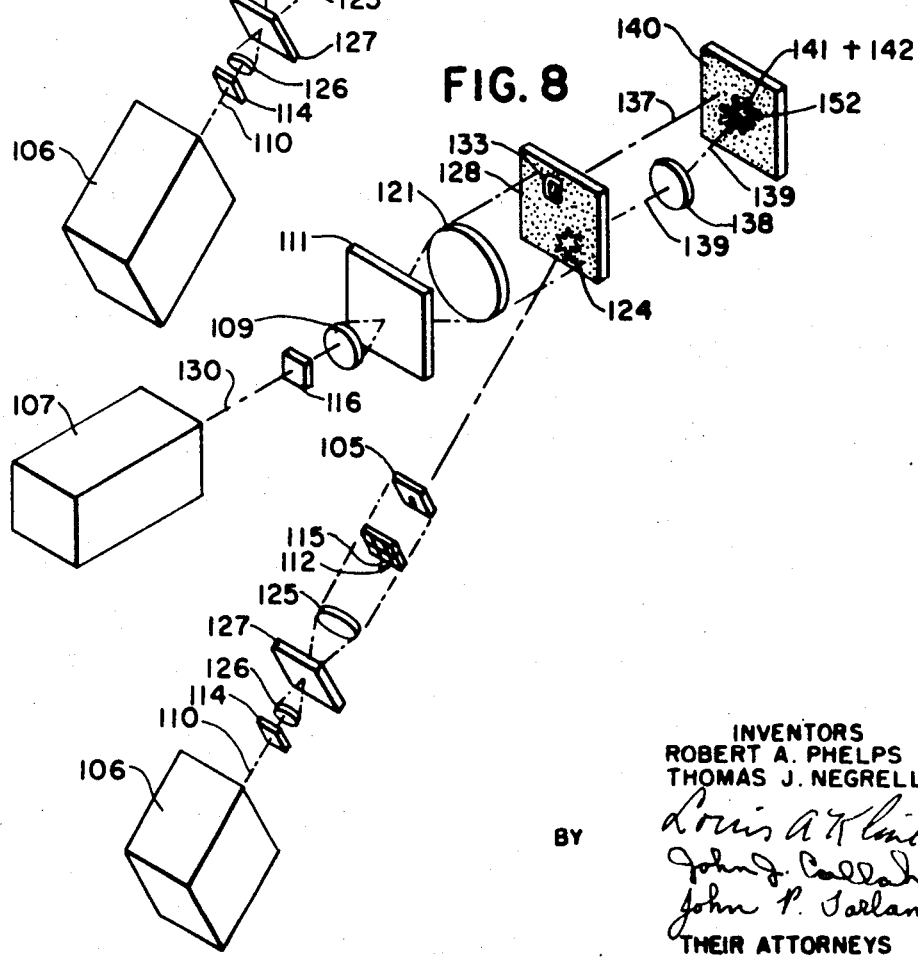

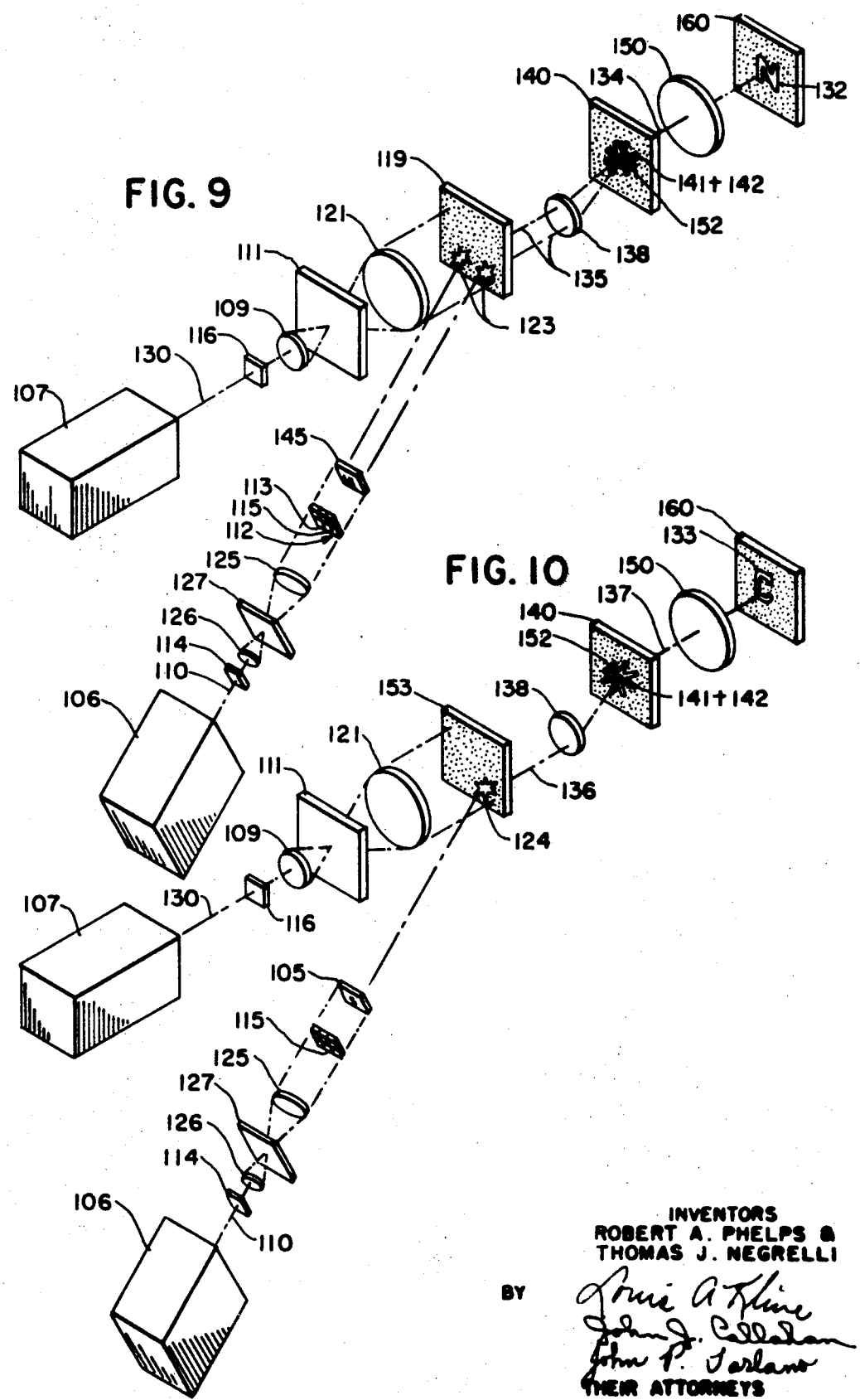

MULTIPLEX HOLOGRAPHY WITH FRESNEL DIFFRACTION PATTERN CODED REFERENCE BEAMS

DESCRIPTION OF THE PRIOR ART

A. W. Lohmann and H. W. Werlick disclose in Physics Letters, Volume 25-A, Page 570 (1967) a method of forming a hologram of the far field of an object beam by passing a reference beam through an encoding pattern and a Fourier transform lens, and an object beam through an object pattern and Fourier transform. The object beam and the reference beam are then interfered at a recording medium at the focal plane of the Fourier transform lenses to form a far field hologram in the recording medium. However, they do not use a Fresnel diffraction pattern of the encoding pattern rather than the encoding pattern itself to form a hologram.

A reference beam which has passed through a Fresnel diffraction pattern has a greater range of spatial frequencies than does a reference beam which has passed through an encoding pattern. A better reconstruction of an object pattern can be achieved by using a reference beam which has passed through a Fresnel diffraction pattern of an encoding pattern rather than the encoding pattern itself.

The method of the present invention makes use of a Fresnel diffraction pattern of an encoding pattern and a Fourier transform lens in a reference beam, and an object pattern in an object beam, to form a hologram of the near or far field of the object beam. The near filed hologram is formed by using the object beam, as it passes through the object pattern, to form a near field hologram. The far field hologram is formed by passing the object beam through a Fourier transformation lens, after it has passed through the object pattern, to form a far field hologram.

A plurality of different Fresnel diffraction patterns of different encoding patterns may be used in the reference beam to form different holograms of different object patterns in a single recording medium. Near or far field holograms may be produced in the recoding medium.

The medium of the present invention eliminates reconstruction of more than one object pattern from a recording medium which has several holograms therein by the use of their Fresnel diffraction patterns of encoding patterns, rather than the encoding patterns themselves.

The method of the present invention improves the imagery of a reconstructed object pattern from a recording medium having only one hologram therein, due to the use of a Fresnel diffraction pattern of an encoding pattern rather than an encoding pattern itself in the reference beam during the formation and reconstruction of the hologram in the recording medium.

An object of the present invention is to form a hologram in a recording medium by incorporating a Fresnel diffraction pattern of an encoding pattern in the reference beam.

Another object of the present invention is to reconstruct an improved image of a selected object pattern from a recording medium containing a hologram made by the method of the present invention therein, by the use of the encoding Fresnel diffraction pattern of an encoding pattern in the reference beam, which is then passed through the recording medium.

Another object of the present invention is to reconstruct a selected object pattern from a recording medium containing several holograms therein, by use of a corresponding encoding Fresnel diffraction pattern of an encoding pattern in the reference beam during its reconstruction.

SUMMARY OF THE INVENTION

A method of forming a hologram in a recording medium, comprising directing an object beam through an object pattern; directing a reference beam through a Fresnel diffraction pattern of an encoding pattern; directing the reference beam through a Fourier transform; and directing said object beam and said reference beam onto said recording medium, which is at the focal point of said Fourier transform lens, to form a hologram of the object beam and the focused reference beam in the recording medium.

DESCRIPTION OF THE DRAWINGS

FIG. 1 is a perspective view of apparatus used in the formation of a far field hologram in a recording medium, by the use of the combination of an object pattern behind a Fourier transform lens in the object, and the Fresnel diffraction pattern of encoding pattern 45 behind a Fourier transform lens in the reference beam.

FIG. 2 is a perspective view of encoding pattern 45, which is being selectively illuminated through an array of shutters.

FIG. 3 is a perspective view of apparatus used in the formation of a far field hologram in the recording medium of FIG. 1 by the use of the combination of an object pattern C behind a Fourier transform lens in the object beam, and the Fresnel diffraction pattern of encoding pattern 5 behind a Fourier transform lens in the reference beam.

FIG. 4 is a perspective view of encoding pattern 5, which is being selectively illuminated through an array of shutters.

FIG. 5 is a perspective view of apparatus used in the reconstruction of the object pattern N from the far field hologram of FIG. 3, by means of a reference beam which has passed first through the Fresnel diffraction pattern of encoding pattern 45 and then through a Fourier transform lens.

FIG. 6 is a perspective view of apparatus used in the reconstruction of the object pattern C from the far field hologram of FIG. 3, by means of a reference beam which has passed first through the Fresnel diffraction pattern of encoding pattern 5 and then through a Fourier transform lens.

FIG. 7 is a perspective view of apparatus used in the formation of a near field hologram in a recording medium, by use of the combination of an object pattern N in the object beam and the Fresnel diffraction pattern of encoding pattern 45 behind a Fourier transform lens in the reference beam.

FIG. 8 is a perspective view of apparatus used in the formation of a near field hologram in the recording medium of FIG. 1 by the use of the combination of an object pattern C in the object beam and the Fresnel diffraction pattern of encoding pattern 5 behind a Fourier transform lens in the reference beam.

FIG. 9 is a perspective view of apparatus used in the reconstruction of the object pattern N from the near field hologram of FIG. 8, by means of a reference beam which passes first through the Fresnel diffraction pattern of encoding pattern 45 and then through a Fourier transform lens.

FIG. 10 is a perspective view of apparatus used in the reconstruction of the object pattern from the near field hologram of FIG. 8, by means of a reference beam which has passed first through the Fresnel diffraction pattern of encoding pattern 5 and then through a Fourier transform lens.

DESCRIPTION OF THE PREFERRED EMBODIMENT

FIG. 1 shows the method of the present invention in the formation of a far field hologram 41. Laser light from a laser 6 sends out a ray 10. The ray 10 is passed through a shutter 14, which is opened, and through a focusing lens 26. A ray 30 from a laser 7 is stopped from passing through a lens 9 by a shutter 16, which is closed until a Fresnel diffraction pattern 23 of the encoding pattern 45 is formed. The focused ray 10 is passed through a pinhole in a screen 27 to shape the ray 10. The shaped ray 10 is then broadened by means of a collimating lens 25. The collimated ray 10 is then selectively passed through selectively opened shutters of an array of shutters 12. The array of shutters controls the area of illumination of the encoding plate 46. The array of shutters 12 and the encoding plate 46 are also shown in FIG. 2. The encoding plate 46 has an array of transparent numerals 1 to 6. The encoding plate 46 can take 64 different configurations by means of the shutters 12. However, the encoding patterns of a 4 and a 5 are formed in the encoding plate 46.

The encoding pattern 45 is formed by selectively opening only the shutters 13 and 15. As shown in FIG. 1, the ray 10 forms the Fresnel diffraction pattern 23 of the encoding pattern 45 as it passes through the encoding plate 46. The Fresnel diffraction pattern 23 of the encoding pattern 45 is formed within an opaque light-sensitive plate 22. The opaque light-sensitive plate 22 may be a photochromic coated glass plate or other opaque light-sensitive plate.

The shutter 16 is opened, and the shutter 14 is closed. The ray 30 from the laser 7 is passed through the open shutter 16. The ray 30 is shaped by being passed through the focusing lens 9 and through a screen 11, which contains a pinhole therein to shape it. The shaped ray 30 is then passed through a collimating lens 21. The collimating lens 21 collimates the ray 30 onto the opaque light-sensitive plate 22, which has therein the Fresnel diffraction pattern 23 of the encoding pattern 45. The opaque light-sensitive plate 22 also has a transparent object pattern 32, which has previously been formed in it. The transparent object pattern 32 is, for example, the letter N, formed in the opaque light-sensitive plate 22. Part of the ray 30 passes through the transparent letter N to form an object beam 34. Another part of the ray 30 passes through the transparent Fresnel diffraction pattern 23 of the encoding pattern 45, to form the reference beam 35. The object beam 34 and the reference beam 35 are focused by Fourier transform lenses 36 and 38. The Fourier transform lens 36 focuses the DC portion of the object beam 34 at its focal point. The Fourier transform lens 38 focuses the DC portion of the reference beam 35 at its focal point. A zero order stop 52 is used in front of the recording medium 40 to block out the DC portion of the reference beam 35. A far field hologram 41 is formed by the interference of the far field of the object beam 34 with the diffracted portion of the reference beam 35 in an opaque recording medium 40, which is positioned in the focal plane of the Fourier transform lenses 36 and 38. A transparent far field hologram 41 is recorded in the opaque recording medium 40. Thus a far field hologram 41 of the interference of the far field of the object beam 34 with the diffracted portion of the reference beam 35 is formed in the opaque recording medium 40. The recording medium 40 may be a photochromic coated glass plate. The far field hologram 41 in the recording medium 40 contains the information of the interference of the object beam 34 with the reference beam 35.

As shown in FIGS. 3 and 4, a far field hologram 42 of the object pattern 33, which is a C, and of the Fresnel diffraction pattern 24 of the encoding pattern 5, is added to the far field hologram 41, on the recording medium 40. The far field hologram 42 is made by the interference of the far field of the object beam 37, which as passed through the C and the Fourier transform lens 36, with the diffracted portion of the reference beam 39, which has passed through the Fresnel diffraction pattern 24 of the encoding pattern 5, through the transform lens 38, and over the zero order stop 52 to the opaque recording medium 40. The Fresnel diffraction pattern 24 of the encoding pattern 5 is made from the illumination of the numeral 5 of the encoding plate 8 by closing the shutter 13, leaving only the shutter 15 opened. The shutter 15 in the array 12 is opened, but the other shutters in the array 12, including the shutter 13, are closed. The ray 10 is passed through the shutter 15, through the numeral 5 of the encoding plate 8 to form a Fresnel diffraction pattern 24 of the encoding pattern 5 in the recording medium 28.

The ray 30 is passed through the recording medium 28 to form a far field hologram 42 in the recording medium 40, as shown in FIG. 3.

As shown in FIG. 5, the bright object pattern 32, which is an N, is reconstructed from the recording medium 40, which contains the far field holograms 41 and 42. A transparent Fresnel diffraction pattern 23 of the encoding pattern 45 is formed in an opaque light-sensitive medium plate 19 by the method of FIG. 1. The ray 30 is passed through the transparent Fresnel diffraction pattern 23 of the encoding pattern 45 to form the reference beam 35. The reference beam 35 is passed through the Fourier transform lens 38, over the zero order stop 52, and through the recording medium 40. The reference beam 35 interferes with the far field hologram 41 in the recording medium 40, which recording medium 40 is at the focal point of the Fourier transform lens 38. The reference beam 35 interferes with the far field hologram 41 to reproduce the object beam 34. The object beam 34 is passed through the Fourier transform lens 29. The Fourier transform lens 29 forms a sharp, clear object pattern 32 on a viewing screen 60. The object pattern 32 is clearly reconstructed on the viewing screen 60 due to the use of a Fresnel diffraction pattern of the encoding pattern 45 rather than the encoding pattern 45 itself to make the hologram 41. It is to be noted that the object pattern 33 is not also reconstructed on the screen 60, due to the great difference between the Fresnel diffraction pattern 23 and the Fresnel diffraction pattern 24. The Fresnel diffraction pattern 24 is needed in order to reconstruct the object pattern 33.

In FIG. 6, the transparent Fresnel diffraction pattern 24 of the encoding pattern 5 is produced in the opaque light-sensitive plate 53 by passing the ray 10 through the transparent numeral 5 of the encoding plate 8. The transparent Fresnel diffraction pattern 24 is produced in the opaque light-sensitive plate 22 by passing the ray 10 through the transparent numeral 5 of the encoding plate 8. Even though the shape of the combined numerals 4 and 5 is somewhat similar to the shape of a 5 alone, the Fresnel diffraction pattern 23 of the encoding pattern 45 is entirely different from the Fresnel diffraction pattern 24 of the encoding pattern 5 in the opaque light-sensitive plate 53. Therefore the transparent Fresnel diffraction pattern 23 will reconstruct only the object pattern 32 from the holograms 41 and 42 in the recording medium 40. The transparent Fresnel diffraction pattern 24 will reconstruct only the object pattern 33 from the holograms in the recording medium 40. Therefore the method of the present invention contemplates the use of different Fresnel diffraction patterns of different encoding patterns for the reconstruction of different object patterns from a recording medium having several holograms therein.

It is to be noted that the recording medium 40 made by the method of field present invention can be used in a printer system. The recording medium 40, having many far field holograms therein, has letters selectively reconstructed therefrom by means of Fresnel diffraction patterns of selected encoding patterns in the reference beam. The reconstructed letters can be used in a printer system.

FIG. 7 shows the method of the present invention in the formation of a near field hologram 141. Laser light from a laser 106 sends out a ray 110. The ray 110 is passed through a shutter 114, which is opened, and through a focusing lens 126. A ray 130 from a laser 107 is stopped from passing through a lens 109 by a shutter 116, which is closed until a Fresnel diffraction pattern 123 of the encoding pattern 45 is formed. The focused ray 110 is passed through a pinhole in a screen 127 to shape the ray 110. The shaped ray 110 is then broadened by means of a collimating lens 125. The collimated ray 110 is then selectively passed through selectively opened shutters of an array of shutters 112. The array of shutters 112 controls the area of illumination of an encoding pattern 45. The encoding plate 145 has an array of transparent numerals 1 to 6. The encoding plate 145 can take 64 different configurations by means of the array of shutters 12.

The encoding plate 145 is illuminated by selectively opening only the shutters 113 and 115. As shown in FIG. 7, the ray 110 forms the Fresnel diffraction pattern 123 of the encoding pattern 45 as it passes through the encoding plate 145. The Fresnel diffraction pattern 123 is formed in an opaque light-sensitive plate 122. The opaque light-sensitive plate 122 may be a photochromic coated glass plate or other opaque light-sensitive plate.

The shutter 116 is opened and the shutter 114 is closed after the Fresnel diffraction pattern 123 is formed in the opaque light-sensitive plate 122. The ray 130 from the laser 107 is passed through the open shutter 116. The ray 130 is shaped by being passed through the focusing lens 109 and through a screen 111, which contains a pinhole therein. The shaped ray 130 is then passed through a collimating lens 121. The collimating lens 121 collimates the ray 130 onto the opaque light-sensitive plate 122, which has Fresnel diffraction patterns 123 of the encoding pattern 45 therein. The opaque light-sensitive plate 122 also has therein a transparent object pattern 132, which has previously been formed. The transparent object pattern 132 is, for illustration, the letter N, formed in the opaque light-sensitive plate 122. Part of the ray 130 passes through the transparent numeral N to form an object beam 134. Another part of the ray 130 passes through the transparent Fresnel diffraction pattern 123 of the encoding pattern 45 to form the reference beam 135. The DC portion of the reference beam 135 is focused by a Fourier transform lens 138. The Fourier transform lens 138 focuses the DC portion of the reference beam 135 at its focal point. A zero order stop 152 in front of the recording medium 140 allows only the diffracted portion of the reference beam 135 to pass onto the recording medium 140. The near field portion of the object beam 134 passes directly onto the recording medium 140. A near filed hologram 141 is formed by the interference of the near field portion of the object beam 134 with the diffracted portion of the reference beam 135 in the opaque recording medium 140, which is positioned at the focal plane of the Fourier transform lens 138. A transparent near field hologram 141 is recorded in the opaque recording medium 140. Thus a near field hologram 141 of the interference of the near field portion of the object beam 134 with the diffracted portion of the reference beam 135 is formed in the opaque recording medium 140. The recording medium 140 may be a photochromic coated glass plate. The near field hologram 141 in the recording medium 140 contains the information of the object beam 134 and of the reference beam 135.

As shown in FIG. 8, a near field hologram 142 of the object pattern 133, which is a C, and of the Fresnel diffraction pattern 124 of the encoding pattern 5 is added to the near field hologram 141 on the recording medium 140. The near filed hologram 142 is made of the interference of the near field portion of the object beam 137, which passes through the C, to the recording medium with the reference beam 139, which passes through the Fresnel diffraction pattern 124 of the encoding pattern 5, through the Fourier transform lens 138, over the zero order stop 152, and onto the recording medium 140. The Fresnel diffraction pattern 124 of the encoding pattern 5 is made from the illumination of the transparent numeral 5 on the encoding plate 105 by closing the shutter 113 and having the shutter 115 opened. The ray 110 is passed through the shutter 115, through the transparent numeral 5 in the encoding plate 105, to form a Fresnel diffraction pattern 124 in the recording medium 128. The beam 130 is passed through the recording medium 128 to form the near field hologram 142 in the recording medium 140.

As shown in FIG. 9, the object pattern 132, which is an N, is reconstructed from the recording medium 140, which contains the near field holograms 141 and 142 therein. The transparent Fresnel diffraction pattern 123 of the encoding pattern 45 is formed in an opaque light-sensitive medium plate 119 by the method of FIG. 7.

The ray 130 is passed through the transparent Fresnel diffraction pattern 123 of the encoding pattern 45 to form the reference beam 135. The reference beam 135 is then passed through the Fourier transform lens 138, over the zero order stop 152, and through the recording medium 140. The diffracted portion of the reference beam 135 interferes with the near field hologram 141 in the recording medium 140, which recording medium 140 is at the focal point of the Fourier transform lens 138. The diffracted portion of the reference beam 135 interferes with the near field hologram 141 to reproduce the object beam 134. The object beam 134 is passed through an imaging lens 150. The imaging lens 150 images the object pattern 132 on a viewing screen 160. The object pattern 132 could have been imaged in a vidicon tube or the viewing medium instead of the viewing screen 160. It is to be noted that the object pattern 133 is not also imaged on the screen 160. This is due to the fact that only the reference beam 136 can reconstruct the object pattern 133, as shown in FIG. 10.

In FIG. 8, the transparent Fresnel diffraction pattern 124 of the encoding pattern 5 is produced in the opaque light-sensitive plate 128 by passing the ray 110 through the transparent numeral 5 of the opaque encoding plate 105. The transparent Fresnel diffraction pattern 124 is produced in the opaque light-sensitive plate 128 by passing the ray 110 through the transparent numeral 5 of the opaque encoding plate 105. Even though the shape of the combined numerals is somewhat similar to the shape of a 5 alone, the Fresnel diffraction pattern 123 of the encoding pattern 45 is entirely different from the Fresnel diffraction pattern 124 of the encoding pattern 5 in the opaque light-sensitive plate 128.

Therefore the transparent Fresnel diffraction pattern 123 will allow reconstruction of only the object pattern 132 from the recording medium 140. The transparent Fresnel diffraction pattern 124 will allow reconstruction of only the object pattern 133 from the recording medium 140. Therefore the method of the present invention contemplates the use of Fresnel diffraction patterns of different encoding patterns for the reconstruction of different corresponding object patterns from multiple near field holograms in a recording medium.

It is to be noted that the recording medium 140 made by the method of the present invention can be used in a printer system. The recording medium 140, having many near field holograms therein, has letters selectively reconstructed therefrom by means of selected Fresnel diffraction patterns in the reference beam. The letters can be used in the printer system.

FIG. 7 shows the information of a near field hologram 141 on a recording medium 140. The coherent monochromatic light ray 110 from the laser 106 is used to make a Fresnel diffraction pattern 123 of the encoding pattern 45 on a recording medium 122. The recording medium 122 has a transparent Fresnel diffraction pattern 123 on an opaque background. The recording medium 122 may be a photochromic material coated glass plate, which turns transparent at areas which are illuminated by the light ray 110.

A transparent object pattern 132 is also formed in the recording medium 122. The object pattern 132 may be formed in a manner similar to the manner in which the Fresnel diffraction pattern 123 of the encoding pattern 45 is formed in the recording medium 122.

The Fresnel diffraction pattern 123 is used to produce the reference beam 135 from the near field hologram 141.

The coherent monochromatic light ray 130 is emitted from the laser 107. After the Fresnel diffraction pattern 123 of the encoding pattern 45, and the object pattern 132, have been formed in the recording medium 122, the coherent monochromatic light ray 130 is allowed to pass through both the object pattern 132 and the Fresnel diffraction pattern 123. A part 134 of the wave front of the coherent monochromatic light ray 130 is diffracted as it passes through the transparent object pattern 132 to form an object beam 134. This near field portion of the object beam 134 is used to make a near field hologram 141.

Another part of the wave front of the coherent monochromatic light ray 130 is diffracted as it passes through the transparent Fresnel diffraction pattern 123 of the encoding pattern 45 to form a reference beam 135. The near field portion of the object beam 134 and the diffracted portion of the reference beam 135 have a phase relationship which is used to make a near field hologram 141.

The object beam 134 is not passed through a Fourier transform lens, so that the near field portion of the object beam 134 may be used. The object beam 134, which has passed through the transparent object pattern 132, is not focused to a point by a Fourier transform lens. Since no Fourier transform lens is used in the path of the object beam 134, the near field of the object pattern 132 is in the object beam 134. The object beam 134 will therefore produce a near field pattern at the object pattern 132 rather than a far field pattern at the recording medium 140.

The DC portion of the reference beam 135 is focused into a point by the Fourier transform lens 138. The Fourier transform lens 138 does not focus the diffracted portion of the reference beam 135, which is diffracted by the Fresnel diffraction pattern 123. The reference beam 135 is passed over a zero order stop 152 to block out the focused DC portion of the reference beam 135. The diffracted portion of the reference beam 135 is passed onto the recording medium 140. The zero order stop 152 is used to allow only the diffracted portion of the reference beam 135 to be used to form the near field hologram 141. The near field pattern from the object beam 134 interferes with the diffracted portion of the reference beam 135 to form a near field hologram 141 in the recording medium 140.

A near field hologram 142 is formed on top of the near field hologram 141 in the recording medium 140. The near field hologram 142 is made from the interference of the near field pattern of the object beam 137 with the diffracted portion of the reference beam 139. The Fresnel diffraction pattern 124 formed in the recording medium 128 is a Fresnel diffraction pattern of a numeral 5. The Fresnel diffraction pattern 124 may be formed in the recording medium 128 by passing a coherent monochromatic light ray 110 through a transparent numeral 5 which is on an opaque background.

FIG. 9 shows the reconstruction of the object pattern 132 from the recording medium 140, which has the near field hologram 141 and the near field hologram 142 therein. The coherent monochromatic light ray 130 from the laser 107 is passed through the Fresnel diffraction pattern 123, which has been formed in an opaque recording medium 119. The recording medium 119 may be a photochromic material coated glass plate. The reference beam 135, which is produced, is passed through the Fourier transform lens 138. The DC portion of the reference beam 135, which is not diffracted from the reference pattern 123, is focused to a spot in the focal plane of the Fourier transform lens 138. The portion of the coherent light ray 135 which was diffracted by the reference pattern 123 is not focused by the Fourier transform lens 138. The diffracted portion of the reference beam 135 is further diffracted by the near field holograms 141 and 142 in the recording medium 140. The DC portion of the reference beam 135 is stopped by a zero order stop 152 from passing on. The diffracted light from the near field hologram 141 is passed through an imaging lens 150. The imaging lens 150 need not be a Fourier transform lens, since a Fourier transformation is not to be performed on the diffracted light 134 from the near field hologram 141. The imaging lens 150 is used to form a real image from the virtual image produced by the near field hologram 141. An imaging system can thus be used in place of the imaging lens 150 to image the object pattern 132 from the recording medium 140, which has the near field hologram 141 therein. The real image of the object pattern 132 is presented on a screen 160.

The object pattern 133 may be alternatively reconstructed from the near field hologram 142 in the recording medium 140 by using the reference pattern 124 to produce a reference beam 136 instead of the reference beam 135. The reconstruction of the object pattern 133 shown in FIG. 10 is similar to that shown in FIG. 9.

What is claimed is:

1. A method of forming a hologram in a recording medium and for reconstructing an image thereof comprising:
    a. directing an object beam through an object pattern;
    b. directing a reference beam through a photographic recording of a Fresnel diffraction pattern of an encoding pattern;
    c. directing the reference beam issuing from the Fresnel diffraction pattern of an encoding pattern through a Fourier transform lens; and
    d. directing said object beam issuing from the object pattern and said reference beam issuing from the Fourier transform lens onto said recording medium which is at the focal plane of said Fourier transform lens to form a hologram of the object beam and the reference beam in the recording medium.

2. A method of forming a hologram in a recording medium and for reconstructing an image comprising:
    a. directing an object beam through an object pattern;
    b. directing a reference beam through a photographic recording of a Fresnel diffraction pattern of an encoding pattern;
    c. directing the object beam issuing from the object pattern through a first Fourier transform lens;
    d. directing the reference beam issuing from the Fresnel diffraction pattern of an encoding pattern through a second Fourier transform lens; and
    e. directing said object beam issuing from the first Fourier transform lens and said reference beam issuing from the second Fourier transform lens onto said recording medium, which is at the focal plane of both of said Fourier transform lenses, to form a hologram of the focused object beam and the focused reference beam in the recording medium.

3. The method of claim 1 wherein the recited steps are successively carried out a plurality of times to form a plurality of holograms in said recording medium.

4. The method of claim 2 wherein the recited steps are successively carried out a plurality of times to form a plurality of holograms in said recording medium.

5. The method of claim 2 including a step of directing a reconstruction beam successively through the Fresnel diffraction pattern of the encoding pattern which is used to encode the hologram, through a Fourier transform lens, through said encoded hologram and through another Fourier transform lens, to reconstruct said object pattern from said recording medium.

6. The method of claim 1 including a step of directing a reconstruction beam successively through the Fresnel diffraction pattern of the encoding pattern which is used to encode the hologram, through a Fourier transform lens, through said encoded hologram and through an imaging lens, to reconstruct said pattern from said recording medium.

7. The method of claim 4 including a step of directing a reconstruction beam from a laser through the associated Fresnel diffraction pattern of the selected encoding pattern, through a Fourier transform lens, through said hologram, and through another Fourier transform lens to form a reconstruction of the selected object pattern on a viewing medium.

8. The method of claim 3 including a step of directing a reconstruction beam from a laser through the associated Fresnel diffraction pattern of the selected encoding pattern, through a Fourier transform lens, through said hologram, and through an imaging lens to form a reconstruction of the selected object pattern on a viewing medium.

UNITED STATES PATENT OFFICE
CERTIFICATE OF CORRECTION

Patent No. 3,608,992          Dated September 28, 1971

Inventor(s) Robert A. Phelps et al.

It is certified that error appears in the above-identified patent and that said Letters Patent are hereby corrected as shown below:

On the cover sheet [54], "MULTIPLEX HOLOGRAPHY WITH TRESNEL DIFFRACTION PATTERN CODED REFERENCE BEANS" should read --
-- MULTIPLEX HOLOGRAPHY WITH FRESNEL DIFFRACTION PATTERN CODED REFERENCE BEAMS --.

Signed and sealed this 12th day of September 1972.

(SEAL)
Attest:

EDWARD M. FLETCHER, JR.          ROBERT GOTTSCHALK
Attesting Officer               Commissioner of Patents